Figure 1:
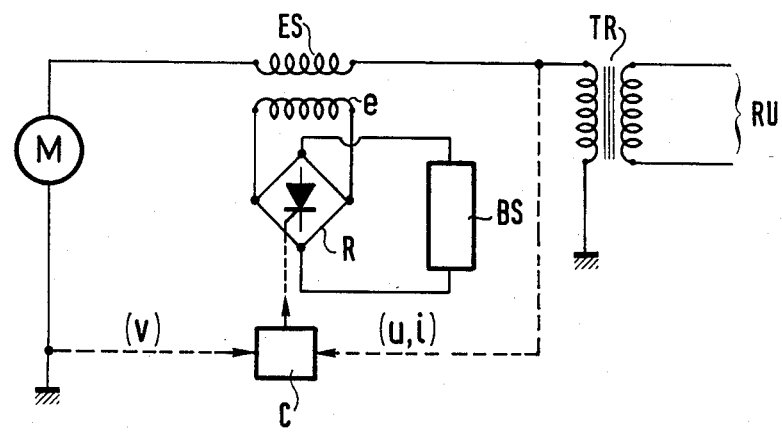

United States Patent [19]

Sabrié

[11] Patent Number: 4,591,776
[45] Date of Patent: May 27, 1986

[54] SYNCHRONOUS MACHINE WITH A SUPERCONDUCTING VOLTAGE AND SPEED REGULATOR

[75] Inventor: Jean-Louis Sabrié, Cravanche, France

[73] Assignees: Alsthom-Atlantique; Electricite de France, both of Paris, France

[21] Appl. No.: 647,575

[22] Filed: Sep. 6, 1984

[30] Foreign Application Priority Data

Sep. 6, 1983 [FR] France ................. 83 14213

[51] Int. Cl.$^4$ ............................................. H02P 5/40
[52] U.S. Cl. .................................. 318/717; 310/10;
310/52
[58] Field of Search ................. 310/52, 40, 10;
318/712-719

[56] References Cited

U.S. PATENT DOCUMENTS

| | | | |
|---|---|---|---|
| 3,373,327 | 3/1968 | Teuber | 310/52 |
| 3,934,163 | 1/1976 | Mailfert | 310/10 |
| 3,999,091 | 12/1976 | Kirtley, Jr. et al. | 310/52 |
| 4,037,123 | 7/1977 | Mole et al. | 310/52 |
| 4,176,292 | 11/1979 | Kalsi et al. | 310/52 |
| 4,295,068 | 10/1981 | Gamble | 310/52 |
| 4,464,617 | 8/1984 | Yantovsky et al. | 318/717 |

OTHER PUBLICATIONS

Schermer et al, "30 MJ Superconducting Magnetic Energy Storage for BPA Transmission Line Stabilizer", IEEE Transactions on Magnetics, vol. MAG-17, No. 5, Sep. 1981, pp. 1950-1953.

Boyer et al, "Superconducting Thre Element Synchronous Machine", IEEE Transactions on Magnetics, vol. MAG-11, No. 2, Mar. 1973, pp. 646-649.

Primary Examiner—David Smith, Jr.
Attorney, Agent, or Firm—Sughrue, Mion, Zinn, Macpeak & Seas

[57] ABSTRACT

A synchronous electric machine has a voltage and speed regulator, comprising a stator provided with a secondary winding and a rotor provided with a primary winding, intended for connection to a feeder grid (operating as a motor) or a user grid (operating as an alternator). The stator winding (ES) is coupled with a second stator winding (e) feeding a static rectifier circuit (R) whose output is connected to a superconducting energy storage winding (BS). The rectifier circuit is controlled by a computer (C) programmed to inject active and reactive power into the stator in such a manner as to attenuate transient conditions.

2 Claims, 2 Drawing Figures

SYNCHRONOUS MACHINE WITH A SUPERCONDUCTING VOLTAGE AND SPEED REGULATOR

The present invention relates to a synchronous machine with a superconducting voltage and speed regulator.

Alternators driven by turbines and coupled to the grid are associated with auxiliary devices that regulate speed and voltage which are subject to variations due to various causes (load-shedding, short-circuits, random oscillations, etc . . . ).

These auxiliary devices have drawbacks, in particular their response times are too long. As a result, in certain cases, differences of speed or of voltage are very difficult to contain by means of existing regulators.

This leads to synchronous machines being dimensioned, both mechanically and electrically for stresses very much greater than their nominal stresses.

An aim of the invention is to provide a synchronous machine having an incorporated speed and voltage regulator which is simple, and which ensures very short response times.

Savings in machine dimensioning result therefrom, and likewise in the dimensions of the turbine (of an alternator) and of the grid coupling transformer, because transient currents are reduced.

A known device for regulating fluctuations in voltage on an AC high tension grid comprises a superconducting winding connected to the grid via an AC-DC converter controlled by a computer.

Reference can be made on this topic to an article entitled "30 MJ Superconducting magnet energy storage for BPA transmission line stabilizer" by R. I. Schermer, H. J. Boenig, & J. Dean in IEE Transactions on Magnetics Vol MAG-17 No. 5, September 1981, page 1950.

Rapidly injecting a suitable phase current into the grid makes it possible to damp oscillations and to regularize the voltage of the grid.

The merit of the inventor is to have considered placing a superconducting winding within the synchronous machine itself, said winding being capable of storing and rapidly reconstituting a suitable amount of energy for regulating the speed and the voltage of the machine.

The present invention provides a synchronous electric machine having a voltage and speed regulator, comprising a stator provided with a secondary winding and a rotor provided with a primary winding, intended for connection to a feeder grid (operating as a motor) or a user grid (operating as an alternator), characterized in that the stator winding is coupled with a second stator winding feeding a static rectifier circuit whose output is connected to a superconducting energy storage winding, the rectifier circuit being controlled by a computer programmed to inject active and reactive power into the stator in such a manner as to attenuate transient conditions.

In a particular embodiment of the invention the rectifier bridge is likewise fed from a special winding of a transformer coupling the machine to the grid.

Figure 2:
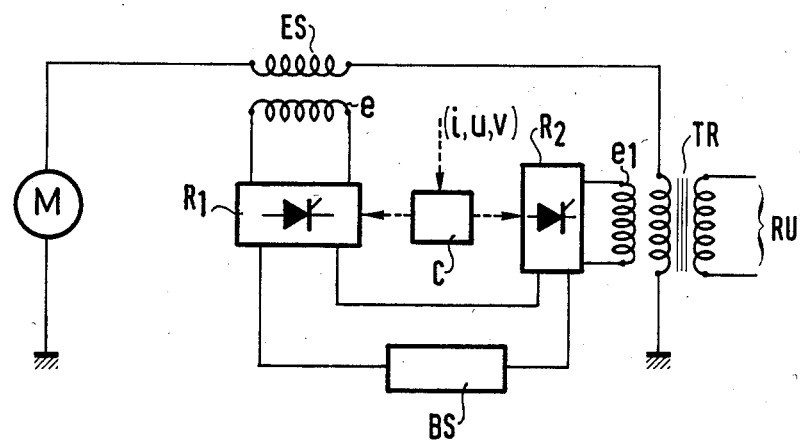

The invention will be understood from the following description of two embodiments made with reference to the accompanying drawing, in which:

FIG. 1 is a circuit diagram of a synchronous machine in accordance with a first embodiment of the invention; and FIG. 2 is a circuit diagram of a synchronous machine in accordance with a variant.

The diagrams in the figures are drawn single phase in order to simplify understanding.

In FIG. 1, the circle M represents the stator and the rotor portions of the machine with the exception of the stator winding ES which is shown outside the circle for clarity in the drawing.

In accordance with the invention, the stator winding ES is associated with and is magnetically and electrically coupled to a second stator winding e which is connected to a first diagonal of a static rectifier bridge R.

A superconducting winding BS is connected to the terminals of the second diagonal of the rectifier brdige.

The rectifier bridge is controlled by a computer C in accordance with a program whose parameters are, for example, the stator current i and voltage u, and the speed v of the machine. The parameters are supplied to the computer by sensors, not shown.

The machine operates either as an alternator to supply current to a user grid RU via a transformer TR, or else as a motor receiving current from the grid.

In the FIG. 1 machine the stator and the rotor may be of conventional type having copper windings operating at above ambient temperature.

In a variant, at least one of the machine windings is a superconductor.

In the event of instability in speed or voltage, the winding BS injects energy into the stator circuit.

Depending on the conditions, the injected current is either in-phase or anti-phase with the stator voltage (adding active energy) or in quadrature thereto (adding reactive energy).

It is thus possible in a quasi-instantaneous manner to stabilize the machine both in voltage (damping small oscillations and hyposynchronous oscillations) and in speed (eliminating speed variations during load-shedding or short circuits (when operating as an alternator) or during large variations in the load torque (when operating as a motor).

As a result the machine has numerous advantages which lead to improved performance and to greatly reduced machine costs and dimensions:

(a) Speed and voltage regulation are quasi instantaneous;

(b) Regulation can easily be optimized regardless of the machine technology and the particular characteristics of the grid in which it is located;

(c) Damping windings may be omitted;

(d) The suggested regulation limits the values of the current, the couple and the speed under all circumstances, thereby enabling the dimensions of the machine to be reduced for given power relative to prior art machines (savings in weight and cost); and (e) The problems of operating the electric grid and the generator are practically independent, thereby making the machine very flexible in operation.

FIG. 2 shows a variant embodiment of the machine. Items common to FIGS. 1 and 2 have the same reference numerals.

In this embodiment, there are two rectifier bridges R1 and R2 (a twelve phase system) connected firstly to the stator winding e and secondly to a winding e1 of the transformer TR.

If the alternator is star connected and the transformer is delta connected, this arrangement makes it possible to limit the level of the harmonics injected by the rectifier.

I claim:

1. In a synchronous electric machine having a voltage and speed regulator, said machine comprising a stator provided with a secondary winding and a rotor provided with a primary winding, intended for connection to a feeder grid (operating as a motor) or a user grid (operating as an alternator), the improvement wherein the stator winding (ES) is coupled with a second stator winding (e), a static rectifier circuit (R) is connected on its input side to said second stator winding (e), said static rectifier is connected on its output side to a superconducting energy storage winding (BS), and a computer (C) is connected to the rectifier circuit such that rectifier is controlled by said computer (C) programmed to inject active and reactive power into the stator in such a manner as to attenuate transient conditions.

2. A synchronous electric machine according to claim 1, wherein said rectifier circuit comprises a rectifier bridge (R1, R2) fed from a special winding (e1) of transformer (TR) coupling the machine to grid (RU).

* * * * *